United States Patent [19]

Styrna

[11] Patent Number: 4,527,014
[45] Date of Patent: Jul. 2, 1985

[54] LOUDSPEAKING TELEPHONE

[75] Inventor: Zbigniew B. Styrna, Kanata, Canada

[73] Assignee: Mitel Corporation, Ontario, Canada

[21] Appl. No.: 419,484

[22] Filed: Sep. 17, 1982

[30] Foreign Application Priority Data

May 21, 1982 [CA] Canada .................................. 403582

[51] Int. Cl.³ ............................................. H04M 9/08
[52] U.S. Cl. ................................ 179/81 B; 179/100 L
[58] Field of Search .............. 179/81 B, 84 R, 100 L, 179/18 BC, 81 R

[56] References Cited

U.S. PATENT DOCUMENTS 3,876,835  4/1975  Barnaby et al. .................... 179/81 B
4,028,505  6/1977  Fassino ............................ 179/170 G
4,115,659  9/1978  Spanel et al. ..................... 179/81 B
4,400,581  8/1983  Jacobson ........................... 179/81 B

OTHER PUBLICATIONS

"Electrical Communication", 1978, vol. 53, No. 4, p. 304.

Primary Examiner—Gene Z. Rubinson
Assistant Examiner—James L. Dwyer
Attorney, Agent, or Firm—Antonelli, Terry & Wands

[57] ABSTRACT

An apparatus and method of controlling the loop gain in a loudspeaking telephone comprising storing reduced representations of an outgoing signal and an incoming signal in corresponding incoming and outgoing storage circuits respectively, in which the storage circuits have much faster attack times than decay times, comparing the representations, and controlling the gains of outgoing and incoming signal paths of the loop according to the degree and polarity of the result of the comparison. With the outgoing signal path connected to a microphone or a signal source and the incoming signal path connected to a loudspeaker, hands-free communication can be carried on having much more natural characteristics than in the past, devoid of most of the "hollow" sound characteristic of prior art systems.

13 Claims, 5 Drawing Figures

LOUDSPEAKING TELEPHONE

This invention relates to telephone systems, and particularly to a loudspeaking telephone.

A loudspeaking telephone allows a telephone subscriber to listen and speak to another party without the necessity of holding a handset to his ear. A microphone and loudspeaker located either in separate housings or in a single housing receives the voice of the subscriber with sufficient sensitivity and reproduces the voice of a remote party sufficiently loudly that a normal conversation can be carried on while the subscriber's hands are otherwise occupied.

Since the two-wire telephone line is bidirectional, the simultaneous use of both a speaker and a microphone in a system having loop gain of greater than one would cause feedback, making the apparatus inoperative. Therefore a loudspeaking telephone usually utilizes a voice operated switch which turns either the microphone or the speaker on, depending on the amplitudes of the signals carried by one-way circuits such as amplifiers connected to the microphone and speaker, which circuits are connected to the two-way telephone line. Thus only the microphone or speaker is "on" at a time, reducing the loop gain to less than one. While voice operated switching allows the microphone and speaker to be contained within a single housing, thus minimizing the obtrusive look of multiple housings and wires associated with the apparatus, voice operated switching causes an unnatural conversation to occur; the speaking party cannot hear short low amplitude interjections and sounds made by the other party while he is speaking, and further, the switching time often causes the initial part of the responses made by the answering party to be clipped off so as not to be heard by the local subscriber. Consequently conversational feedback is not given to the local subscriber, the conversation slows, becomes stilted, and both parties to the call find the conversation unnatural.

Since either the microphone or speaker is on at one location at all times, when the microphone is on, the other party hears room voices, and the first or speaking party is heard having a "hollow" sound. This has been found to be objectionable and inhibiting to the conversation.

In addition, under some conditions should both parties be speaking at the same time with about equal amplitude, it is possible for the switching apparatus at both sides to become switched into their microphone operation mode. Thus when both parties stop speaking, they hear no noise or sounds from the other parties; in normal conversationa response would be expected, but their loudspeakers are silent. This also decreases the naturalness of the conversation.

Further, should no parties be speaking, but some line noise be present, the apparatus can be switched so that the loudspeakers of both parties are "on". Each party expects the other one to speak, causing unnatural silent periods in the conversation.

One prior way of attempting to overcome this problem, was to separate the speaker and microphone, giving each signal feeding circuit more gain, and allowing the acoustic attenuation between the microphone and speaker due to their separation to reduce the loop gain between the two to less than unity. While it was found that a more normal type of conversation can be carried on with this apparatus, two housings and accompanying wires are required increasing the complexity and cost of the apparatus. Further, it has been found that often the user attempts to speak to the loudspeaker rather than to the microphone, thus reducing the amplitude of the sound to be transmitted to the other party.

The present invention is a loudspeaking telephone circuit which uses voice operated switching, thus allowing the microphone and speaker to be considerably closer together than in the latter system (i.e. in a single housing), yet has a switching characteristic which allows a considerably more natural conversation to take place than in the prior art.

The microphone of the telephone is turned on only when a party is speaking; i.e. the gain of the microphone amplifier follows the speech envelope of the speaking party. As a result the return of room noise and to previous "hollow" sound are significantly reduced, resulting in a more natural and pleasant sound of the incoming voice, thus enhancing the hands-free conversation.

In the present invention, representations of the outgoing signal and of the incoming signal speech envelope are stored, and the stored signals are compared for amplitude, the comparison causing variation in the gain of variable gain amplifiers in one-way transmission paths to and from the microphone and speaker respectively. Lower amplitude representations of each of the signals are stored in the storage means for the other signal. Consequently the differential over which an opposite signal must increase in order to cause switching is significantly reduced.

The storage (attack) time of each storage means is made very much faster than the decay time of each storage means. Consequently an interruption to a speaking party has a greater possibility of causing switching than a continuation of the same speech burst.

Further, the microphone amplifier is biased so as to be on or transmissive during silent periods, thus avoiding the constant reception of line noise which would otherwise give the impression that the remote party is attempting to speak, during quiet periods.

The result is an apparatus which provides a more natural conversational interaction between the parties, since small interjections by the remote party now can cause switching of the loudspeaking amplifier, allowing the local subscriber to hear the interjections, yet immediately carries any originating sounds from the local subscriber during quiet intervals since the microphone amplifier is normally biased on. This avoids cutting off of the initial sounds of a speech burst which would otherwise occur if the natural rest state of the apparatus were to have the loudspeaker biased on and reproducing line noise, and entailing a switching time.

In addition, the present invention utilizes variable gain amplifiers in the microphone and loudspeaker circuits. Thus the loop gain can be maintained constant, which allows the reproduction of sounds in both directions during operation, depending on the relative signal amplitudes in both speech directions, thus giving a more natural operational characteristic as compared to prior art loudspeaking telephones which utilized absolutely switched amplifiers.

In general, the invention is a loudspeaking telephone comprising a first circuit for applying a first signal from a microphone to a bidirectional telephone line, a second circuit for applying a second signal from the telephone line to a speaker, the latter signal including a reduced value of the signal from the microphone, further first and second circuitry for refreshing and storing decaying DC representations of the first and second signals, the refresh time characteristic of the storing apparatus being significantly faster than its decay time characteristics, an apparatus for comparing the DC representations, and for providing a gain control signal in response thereto. Circuitry is also included for adjusting the gains of the first and second applying circuits in accordance with the gain control signal to provide transmission pads to the telephone line or the speaker in accordance with the relative levels of the DC representations stored in the first and second DC storage apparatus respectively.

More particularly, the loudspeaking telephone circuit is comprised of a microphone, a speaker, a hybrid for connection to a telephone line having further input and output ports, a first variable gain amplifier having its input connected to the microphone and its output connected to the input port of the hybrid, and a second variable gain amplifier having its output connected to the speaker, and its input connected in a circuit to the output port of the hybrid. First and second rectifier circuits have similar poles connected in corresponding circuit paths to the input and output ports respectively of the hybrid. Signal storage circuitry is included for storing individual signals output at the other poles of the rectifier circuits, and a limiter is connected across the signal storage circuits. A differential amplifier has separate inputs connected to corresponding ones of the signal storage circuits, for receiving individual signals at its separate inputs. Further circuitry is connected between the output of the differential amplifier and gain control inputs of the first and second variable gain amplifiers, for driving the gain control inputs and to reciprocally control the variable gain amplifiers. It is preferred that the signal storage circuitry should have an attack time which is significantly shorter than its decay time.

A better understanding of the invention will be obtained by reference to the detailed description below, in conjunction with the following drawings, in which.

Figure 1:
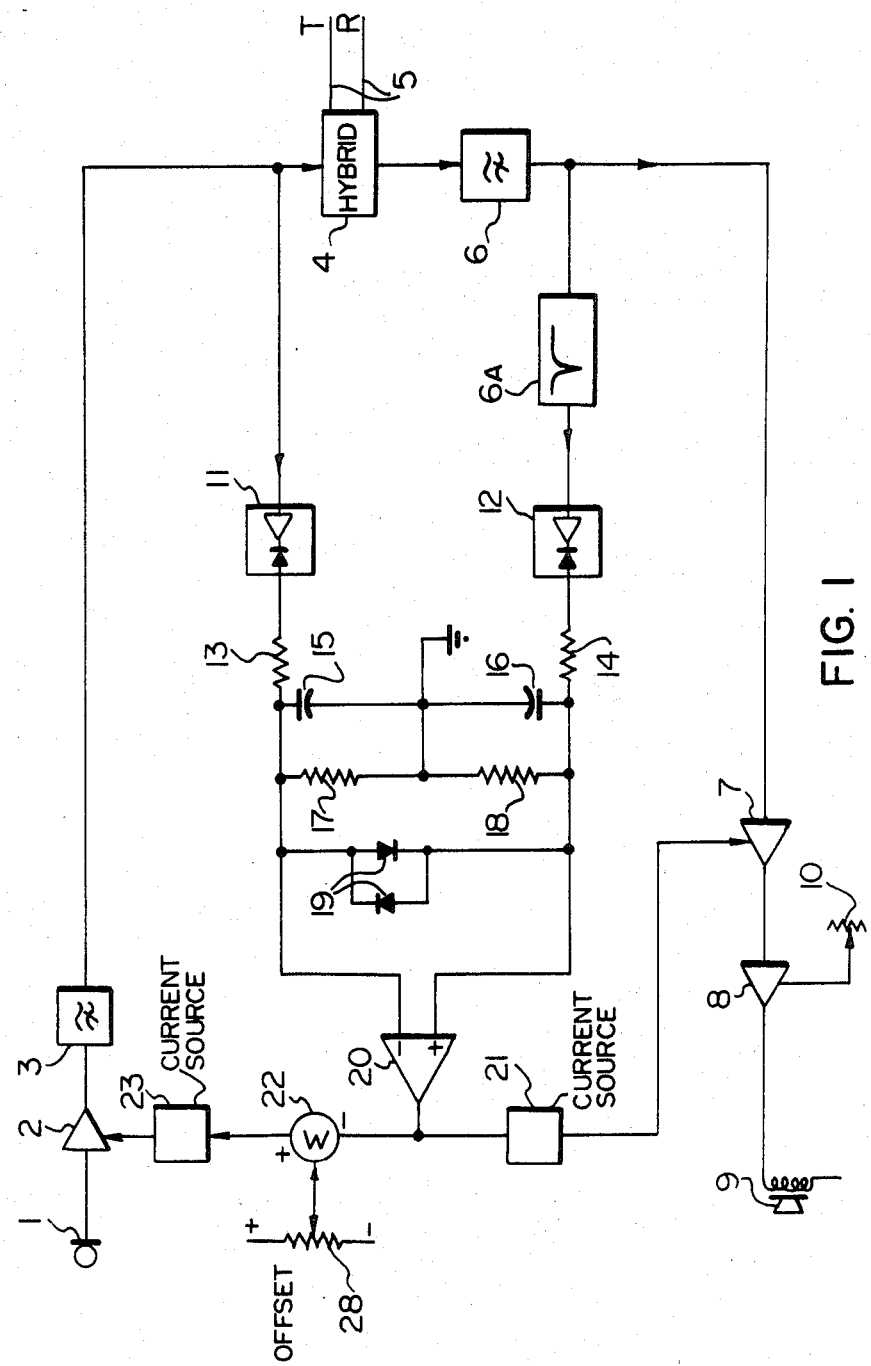
FIG. 1 is a block diagram of the invention.

Turning first to FIG. 1, which shows a block schematic of the invention, a microphone 1 is connected via a variable gain amplifier 2 and a high pass filter 3 to one port of a hybrid 4 which is connected to the tip and ring leads of a bidirectional telephone line 5. A second high pass filter 6 has its input connected to another port of hybrid 4, and has its output connected through variable gain amplifiers 7 and power amplifier 8 to a loudspeaker 9. The loudness of the reproduced signal in loudspeaker 9 can be controlled by a potentiometer 10 connected to the variable gain control input of power amplifer 8, in the conventional manner.

It should be noted that the purpose of the high pass filter is to remove low frequency components of the speech signals carried by the circuits to which their inputs and outputs are connected and to remove 60 Hz power frequency signals and their near odd harmonics (i.e. 3rd and 5th). In this respect, should the signals have a substantial roll-off characteristics below 400 hertz, the high pass filters need not be used. However, in most designs the high pass filters should be used; it is preferred that they should have a characteristic similar to that shown in FIG. 2C, in which the low frequency roll off begins at about 400 hertz and then decreases at 12 db per octave. The high pass filter can be a second order single pole type, with a Q of approximately 5, and the pole located at about 400 hertz.

The output of high pass filter 3 is connected through a rectifier circuit 11, preferably comprised of a $\times 5$ gain amplifier connected to the cathode of a diode. The output of high pass filter 6 is connected to a similar rectifier circuit 12. The anodes of diodes 11 and 12 are connected through corresponding resistors 13 and 14 to terminals of shunt capacitors 15 and 16 which have their other terminals connected to ground. Resistors 17 and 18 are connected in parallel with capacitors 15 and 16 respectively. A pair of oppositely poled parallel connected diodes 19, operating as a limiter is connected between the junctions of resistors 13 and 17 and the junction of resistors 14 and 18. The same junctions are connected to individual inputs of differential amplifier 20.

The output of differential amplifier 20 is connected through voltage controlled current source 21 to the gain control input of amplifier 7. The latter output is also connected to an adder 22, which has its output connected through voltage controlled current source 23 to the gain control input of the amplifier 2. The other input of adder 22 is connected to the tap of a potentiometer 24 which is connected between sources of positive and negative voltage.

Figure 2A:
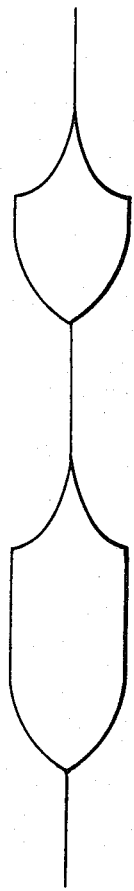
FIG. 2A is a waveform diagram of representative speech burst envelopes.
Figure 2C:
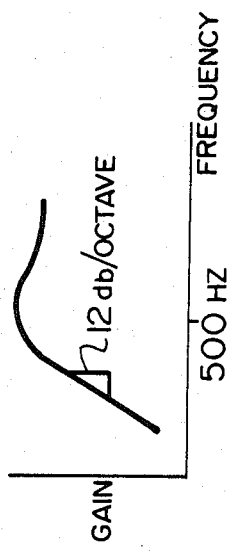
FIG. 2C is a graph of the trasmission characteristics of high pass filters preferred to be used with the present invention.

A description of the operation of the circuit will now be given, disregarding adder 22 and filters 3 and 6 for a moment. Assuming that a subscriber speaks into microphone 1, the resulting electrical signal is passed through variable gain amplifier 2, and through hybrid 4 to the tip and ring leads of the telephone line. A typical speech envelope is shown in FIG. 2A which is representative of the voice signal entering or exiting hybrid 4.

The voice signal from microphone 1 passes through rectifier circuit 11, which eliminates one polarity of the speech envelope signal, and the resulting varying DC signal is applied to capacitor 15, in which it is stored. The charging time constant of capacitor 15 is partly controlled by resistor 13; a discharge path around capacitor 15 is provided by resistor 17 which partially determines its discharge or decay time-constant. It is preferred that the attack (charge) time of capacitor 15 should be very much faster than its decay time, e.g. 40 times as fast. A prototype of the present invention successfully used an attack time of 5 milliseconds and a decay time of 200 milliseconds. For a sudden short speech burst, capacitor 15 thus will retain a charge generally according to the solid line characteristic 24 shown in FIG. 2B.

A portion of the outgoing voice signal also appears due to the return loss of hybrid 4 at the input of rectifier circuit 12, reduced in amplitude relative to the signal at the input of rectifier circuit 11. It is preferred that resistor 14 with capacitor 16 and resistor 18 should have similar attack and decay characteristics as resistor 13, capacitor 15 and resistor 17. The rectified speech envelope in the form of a varying DC signal thus charges capacitor 16, and appears as the solid line characteristic 25 shown in FIG. 2B.

It should be noted that in some cases the fifth harmonic of 60 Hz power line frequency, 300 Hz will have objectionable amplitude. A 300 Hz notch filter 6A can be connected between the output of filter 6 and the input of rectifier circuit 12 to eliminate this interfering signal.

Figure 2B:
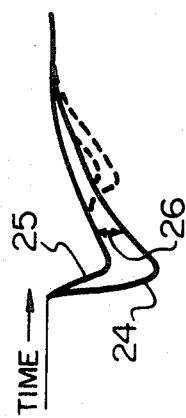
FIG. 2B is a graph showing the attack and decay characteristics of the storage means, for illustrating the operation of the invention.

The junction of resistor 13 and capacitor 15 is connected to one input of differential amplifier 20 and the junction of resistor 14 and capacitor 16 is connected to the other input of differential amplifier 20. The voltage differential between the amplitudes of the stored signals on capacitors 15 and 16, represented by the difference shown by arrow 26 in FIG. 2B, is passed through differential amplifier 20.

With the diodes in rectifier circuits 11 and 12 poled as shown, with their anodes toward capacitors 15 and 16, the differential between the negative portions of the speech envelope is passed through amplifier 20 and the resulting output signal of the differential amplifier 20 is negative in polarity. This signal is converted to separate reciprocally varying currents in current sources 23 and 21, which currents are applied to the gain control inputs of variable gain amplifiers 2 and 7. As a result, the gain of amplifier 2 is increased by a value represented by arrow 26 in FIG. 2B, while gain of amplifier 7 is reduced by about the same amount. Thus the gain balancing (as opposed to a hard or soft switching) is produced, as between the outgoing signal from microphone 1 and received signal reproduced in loudspeaker 9.

It should be noted that the outgoing speech burst charges the capacitors 15 and 16 quickly, which charge decays slowly. Assume now that a signal is received from the tip and ring leads. This signal is applied to rectifier circuit 12, and quickly adds to the remaining charge on capacitor 16. The reduced value also adds to the charge on capacitor 15, due to the return line loss of hybrid 4. Now the charge on capacitor 16 becomes greater (i.e. more negative) than that stored on capacitor 15, as shown by the dashed line portion of the line 25 of FIG. 2B. The additional charge on capacitor 15 is shown by the dashed line portion of line 24 of the same figure. However the overall difference results in the switching of the output signal of the differential amplifier 20 which causes the output current of current sources 23 and 21 to change polarity. As a result, when the charge on capacitor 16 is greater than that on capacitor 15, the gain of amplifier 7 increases and the gain of amplifier 2 decreases. The loop gain is thus maintained, avoiding feedback.

It should be noted that the overall effect is to vary the gain of amplifiers 2 and 7 in accordance with the varying DC signals stored on capacitors 15 and 16 but that these signals individually increase quickly with the reception of speech bursts and decay slowly allowing interjections, etc. to be reproduced. The relative amplitudes of the signals which cause the reciprocal variation in gain of amplifiers 2 and 7 has been found to result in a substantially more natural conversation than in prior art loudspeaking telephones.

Since low frequency components of the voice signal contain substantial energy, which would charge capacitors 15 and 16 inordinately, it has been found desirable to ensure that the low frequency portion of the bandwidth is severely limited. For this reason high pass filters 3 and 6 have been utilized as noted, which cut low frequency signals below 400 hertz by about 12 db per octave.

In addition, in order to ensure that very loud signals do not overdrive differential amplifier 20, a limiter or clamp of conventional form is provided using diodes 19, which restricts the amplitude of the signal applied to differential amplifier 20 to tolerable levels.

It should be noted that the gain used in rectifier circuits 11 and 12 also controls the amplitude of the signal stored on capacitors 15 and 16 which are input to differential amplifier 20, and selection or adjustment of this gain can be effected to fine tune the circuit, if desired.

As noted earlier, it is preferred to maintain the gain of amplifier 2 so that it will pass signals from microphone 1 during quiet periods when there is no input signal from the telephone line 5, and no voice signal input to microphone 1. An adder 22 in the circuit between the output of differential amplifier 20 and current source 23 provides means for adding an offset voltage to the output signal of differential amplifier 20, for application to the gain control input of amplifier 2. Potentiometer 28 controls the amount of offset, which is intended to be an internal factory adjustment to the circuit prior to shipment, (although it and can be a user controlled adjustment if found desirable).

Figure 3:
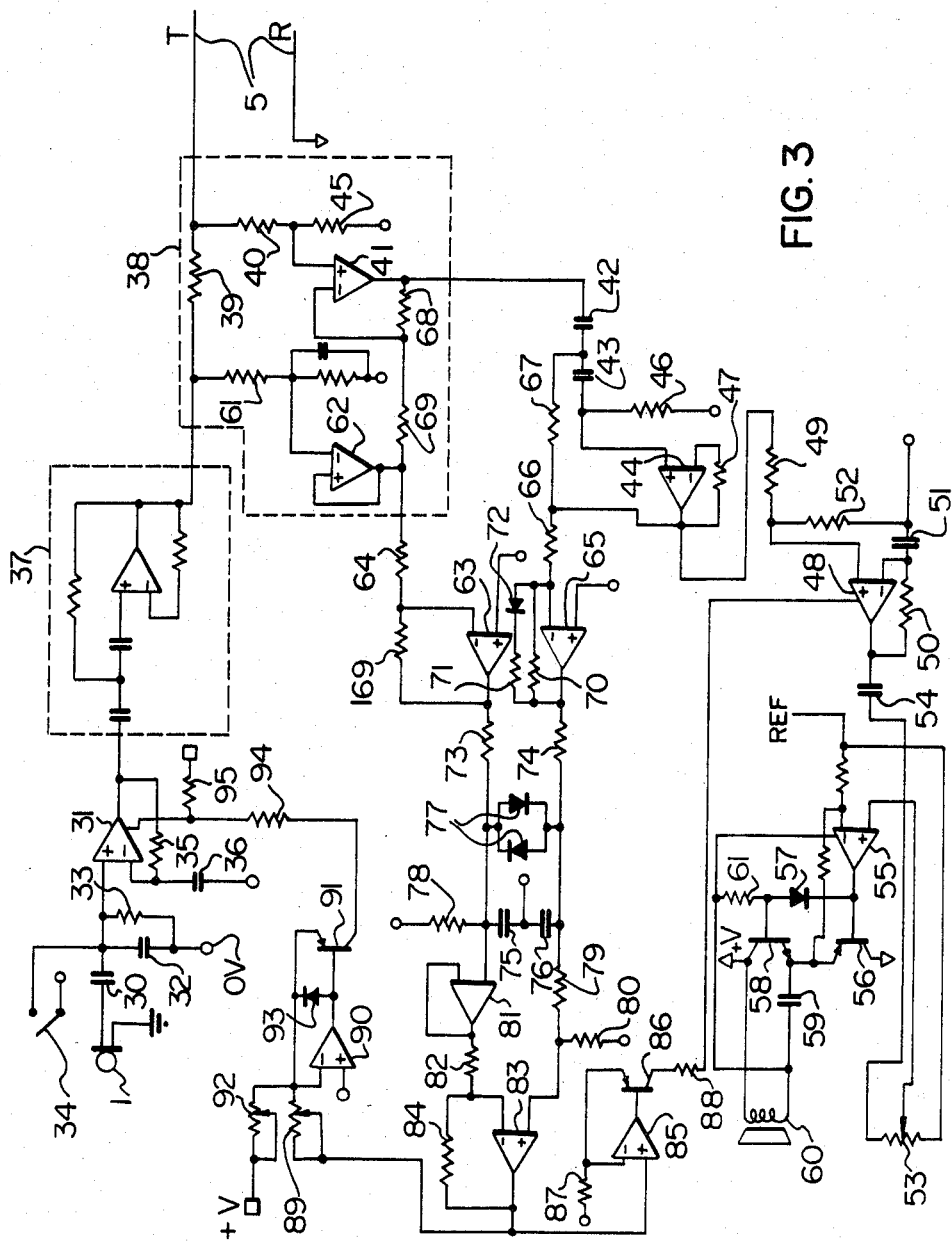
FIG. 3 is a schematic diagram of the preferred form of the present invention.

A schematic diagram of the preferred form of the invention is shown in FIG. 3. In FIG. 3, a symbol convention is used in which a small circle denotes a zero volt power supply source, a small square denotes a positive voltage power supply source, and a small triangle denotes a different positive voltage power supply source. One of each symbol is labelled as such.

Signals from microphone 1 are passed through coupling capacitor 30 and are applied to the noninverting input of variable gain amplifier 31, bypassed by capacitor 32 and parallel resistor 33 which together form a high frequency roll-off circuit. The input signal to amplifier 31 typically is about 10 millivolts, and amplifier 31 typically would have a gain of about 300.

The non-inverting input of amplifier 31 is also bypassed by switch 34 which allows a subscriber to mute the microphone, by applying cutoff DC voltage to the input of amplifier 31.

The output signal is applied through resistor 35 back to the inverting input of amplifier 31, which input is bypassed by capacitor 36 to shunt AC signals therefrom. Accordingly offset compensation is automatically provided to the amplifier by its own output signal.

The output signal of amplifier 31 is also applied to a second order single pole high pass filter 37 of conventional construction, which preferably has a Q of about 5, and its pole at about 400 hertz. This filter corresponds to filter 3 shown in FIG. 1.

The output signal from filter 37 is applied to hybrid 38, passing through resistor 39, and then is applied to tip lead T of a two-way telephone line 5. The ring lead of the telephone line is shown connected to an external power supply terminal; which applies voltages to the tip and ring leads for powering the present circuit, and to a polarity guard, both of which are of conventional construction and do not form part of the invention described here.

Signals on the tip lead pass through hybrid 38 via a resistor 40 to the non-inverting input of operational amplifier 41, the output of which is connected via capacitors 42 and 43 in series to the non-inverting input of operational amplifier 44. The non-inverting inputs of amplifiers 41 and 44 are connected to a zero volts source via resistors 45 and 46 respectively. The inverting input of amplifier 44 is connected to its output via resistor 47. Its output is connected to the noninverting input of a variable gain amplifier 48 via resistor 49. Variable gain amplifier 48 is connected similarly as amplifier 31, its output being connected to its inverting input via resistor 50, the latter input being bypassed by capacitor 51. The non-inverting input of amplifier 48 is connected to a zero volt source via resistor 52.

Accordingly signals appearing on the tip lead pass through through amplifier 41, capacitors 42 and 43, amplifier 44 and variable gain amplifier 48. After passing through amplifier 48 they are applied to a loudspeaker volume control potentiometer 53 via coupling capacitor 54. The tap on potentiometer 53 is connected to the non-inverting input of operational amplifier 55, while the other terminal of the potentiometer is connected to a reference voltage. The output of amplifier 55 is applied to the base of a power transistor 56, and via diode 57, which is poled in the same direction as the emitter-base junction of transistor 56, to the base of power transistor 58. The emitter of transistors 56 and 58 are connected together. Power transistor 58 is shown as NPN type, while power transistor 56 is of PNP type. Accordingly transistors 56 and 58 operate in push-pull. The emitter of transistor 58 is connected through capacitor 59 to loudspeaker 60, which is also connected to source +V and to the collector of transistor 58.

The junction of capacitor 59 and loudspeaker 60 is connected to the power input terminal of power amplifier 55, as well as through resistor 61 to the junction of diode 57 and the base of transistor 58, in order to provide base bias for the latter transistor and operation voltage for amplifier 55. This voltage will be greater than the supply voltage +V by the AC value of the signal applied to the loudspeaker.

The output signal from filter 37 passes through hybrid 38 via resistor 61, being applied to the inverting input of operational amplifier 62, and from the output of amplifier 62 to the inverting input of open-collector comparator 63 via resistor 64. Comparator 63 operates to provide both gain and rectification, forming the function of rectifier circuit 11 referred to in FIG. 1. A similar open collector comparator 65 has its inverting input connected via series resistors 66 and 67 to the junction of capacitors 42 and 43, whereby it receives the output signal of operational amplifier 41.

Operational amplifier 41 has its output connected to its inverting input via resistor 68, which input is connected to the output of operational amplifier 62 via resistor 69. The hybrid 38 is thus defined.

The output of comparator 63 is connected to its inverting input via resistor 169 and the output of comparator 65 is connected to its inverting input via resistor 70, the latter being bypassed by the series second occurrence of resistor circuit 71 and diode 72. Comparator 65 operates similarly to comparator 63, and forms the function of rectifying circuit 12 described with reference to FIG. 1.

The outputs of comparators 63 and 65 are connected via resistors 73 and 74 respectively to one terminal of each of corresponding capacitors 75 and 76, which have their other terminals connected together to zero volts. Oppositely poled diodes 77 are connected in parallel between the junctions of resistor 73 with capacitor 75 and resistor 74 with capacitor 76. The junction of resistor 73 and capacitor 75 is connected to a source of zero volts power source through a resistor 78, and the junction of resistor 74 and the capacitor 76 is connected to the same source via the series circuit of resistors 79 and 80. Thus the charging circuits for capacitors 75 and 76 are through resistors 73 and 74 respectively, and the resulting similar time constants define the attack time. The discharge circuit of capacitors 75 and 76 pass through resistors 78, and 79 and 80 respectively, the time constant thereof forming the decay time. Preferably the capacitors 75 and 76 are about 0.3 microfarads, resistors 73 and 74 are about 500 K ohms, resistor 78 is 1 megohm, and resistors 79 and 80 total 1 megohm.

The junction of resistor 73 and capacitor 75 is connected to the input of a buffer amplifier 81, the output of which passes via resistor 82 to the inverting input of differential amplifier 83. The varying DC voltage level on capacitor 76 is applied to the non-inverting input of differential amplifier 83 via resistor 79. The output of differential amplifier 83 is connected to its inverting input via resistor 84.

Thus a portion of the speech signal from microphone 1 is returned via hybrid 38 through the rectifying circuit formed by open collector comparator 63, which signal charges capacitor 75 via resistor 73. A portion of the signal also passes through resistor 39, operational amplifier 41 in hybrid 38, capacitor 42, and comparator 65, which charges capacitor 76 to a lesser extent. The charges decay through resistor 78, and resistors 79 and 80 respectively. The differential between the two voltages passes through differential amplifier 83. The differential is limited or clamped by diodes 77.

The output signal from differential amplifier 83 passes through a current source formed of operational amplifier 85 driving the base of transistor 86, the emitter of transistor 86 and inverting input of operational amplifier 85 being connected to a zero volts power supply source through a resistor 87. The collector of transistor 86 is connected via resistor 88 to the gain control input of variable gain amplifier 48. Thus the gain of amplifier 48 increases as the output voltage level from differential amplifier 83 goes more positive, which output voltage level is converted to an appropriate current via operational amplifier 85 and transistor 86. Speech signals which are input from the telephone line 5 are thus amplified to a greater extent with increased gain in an amplifier 48.

The output signal from differential amplifier 83 is also applied through a variable resistor 89 to a current source comprised of operational amplifier 90 driving the base of a transistor 91. The inverting input of operational amplifier 90 is connected to a source +V through variable resistor 92, and is also connected to the emitter of transistor 91. The emitter and base junction of the latter transistor is bypassed by an oppositely poled limiting diode 93.

Variable resistor 92 provides an offset voltage, which is added to the signal input to operational amplifier 90 from differential amplifier 83. The offset voltage level is controlled by variable resistor 89.

The current output from transistor 91 passes from its collector through resistor 94 to the gain control input of variable amplifer 31, which input is also connected to the voltage +V via resistor 95.

In the absence of any signal from the output of amplifier 83, the offset voltage causes a current to be generated which keeps the gain of amplifier 31 positive.

Thus the output signal from differential amplifier 83 reciprocably varies the gains of variable gain amplifiers 31 and 48, while the level of gain control applied to the variable gain amplifier 31 connected in the output circuit of microphone 1 additionally has a variable offset capability controlled by variable resistor 92, which preferably retains the microphone circuit path dominant during quiet periods.

It has been found that the above circuit provides a substantially more realistic and acceptable gain control characteristic which substantially aids the flow of conversation in a loudspeaking telephone, and substantially eliminates the previous undesirable effects of cutting off the beginning of speech bursts, allowing brief interruptions to form voice feedback comments to the talking party, while allowing his speech to be transmitted through to the remote party, and substantially reduces the "hollow" sound and room noises usually characteristic of hands free telephones.

A prototype circuit has been successfully integrated into a single telephone set in which the microphone faces downwards generally towards the table top on which the telephone rests, and in which the loudspeaker faces generally upward, the microphone and loudspeaker of course being acoustically isolated within the housing. A significantly enhanced conversational facility with improved operating characteristics results.

A person understanding the above description may now conceive of alternative embodiments or other structures utilizing the principles described herein. All are considered to be within the sphere and scope of this invention as defined in the claims appended hereto.

I claim:

1. A loudspeaking telephone circuit comprising,
   (a) a microphone,
   (b) a loudspeaker,
   (c) a hybrid for connection to a telephone line, having an input and an output port,
   (d) a first variable gain amplifier having its input connected to the microphone and its output connected in a circuit to the input port of the hybrid,
   (e) a second variable gain amplifier having its output connected in a circuit to the speaker, and its input connected in a circuit to the output port of the hybrid,
   (f) a first rectifier means having first and second poles, said first pole being connected in a circuit to the input port of the hybrid,
   (g) a second rectifier means having first and second poles of similar polarity as the first and second poles of the first rectifier means, said first pole of the second rectifier means being connected in a circuit to the output port of the hybrid,
   (h) first and second signal storage means having attack times which are significantly shorter than the decay times, for storing individual signals carried by said second poles of the first and second rectifier means respectively,
   (i) a differential amplifier having separate inputs connected to corresponding ones of the signal storage means, for receiving individual signals at its separate inputs,
   (j) means for driving gain control inputs of the first and second variable gain amplifiers in opposite gain directions connected between the output of the differential amplifier and the gain control inputs of the first and second variable gain amplifiers, and
   (k) means for applying an offset to the first variable gain amplifier gain control input whereby a voice transmission path is provided from the microphone to the hybrid in the absence of signal received from the telephone line.

2. A loudspeaking telephone circuit comprising:
   (a) a microphone,
   (b) a loudspeaker,
   (c) a hybrid for connection to a telephone line, having an input and an output port,
   (d) a first variable gain amplifier having its input connected to the microphone and its output connected in a circuit to the input port of the hybrid,
   (e) a second variable gain amplifier having its output connected in a circuit to the speaker, and its input connected in a circuit to the output port of the hybrid,
   (f) a first rectifier means having first and second poles, said first pole being connected in a circuit to the input port of the hybrid,
   (g) a second recitifer means having first and second poles of similar polarity as the first and second poles of the first rectifier means, said first pole of the second rectifier means being connected in a circuit to the output port of the hybrid,
   (h) first and second signal storage means each comprised of a capacitor for storing individual signals carried by said second poles of the first and second rectifier means respectively, the decay time of the signal storage means being about forty times as long as its attack time,
   (i) a differential amplifier having separate inputs connected to corresponding ones of the signal storage means, for receiving individual signals at its separate inputs,
   (j) means for driving gain control inputs of the first and second variable gain amplifiers in opposite gain directions connected between the output of the differential amplifier and the gain control inputs of the first and second variable gain amplifiers, and
   (k) means for applying an offset to the first variable gain amplifier gain control input whereby a voice transmission path is provided from the microphone to the hybrid in the absence of signal received from the telephone line.

3. A loudspeaking telephone circuit as defined in claim 1 or 2 in which the decay time is about 200 milliseconds and the attack time is about 5 milliseconds.

4. A loudspeaking circuit comprising:
   (a) a microphone,
   (b) a loudspeaker,
   (c) a hybrid for connection to a telephone line, having an input and an output port,
   (d) a first variable gain amplifier having its input connected to the microphone and its output connected in a circuit to the input port of the hybrid,
   (e) a second variable gain amplifier having its output connected in a circuit to the speaker, and its input connected in a circuit to the output port of the hybrid,
   (f) a first rectifier means having first and second poles, said first pole being connected in a circuit to the input port of the hybrid,
   (g) a second rectifier means having first and second poles of similar polarity as the first and second poles of the first rectifier means, said first pole of the second rectifier means being connected in a circuit to the output port of the hybrid,
   (h) first and second signal storage means comprised of first and second shunt capacitors connected via first and second series resistors to said second poles of the first and second rectifier means respectively, and first and second shunt resistors connected in parallel with respective ones of said capacitors, for storing individual signals carried by said second poles of the first and second rectifier means respectively, wherein the time constants of the series resistors with the capacitors is much shorter than the time constants of the shunt resistors with the capacitors, (i) a differential amplifier having separate inputs connected to corresponding ones of the signal storage means, for receiving individual signals at its separate inputs, (j) means for driving gain control inputs of the first and second variable gain amplifiers in opposite gain directions connected between the output of the differential amplifier and the gain control inputs of the first and second variable gain amplifiers, and (k) means for applying an offset to the first variable gain amplifier gain control input whereby a voice transmission path is provided from the microphone to the hybrid in the absence of signal received from the telephone line.

5. A loudspeaking telephone as defined in claim 1, 2 or 4, further including a first high pass filter having a center frequency at about 400 HZ connected between the output of the first variable gain amplifier and the input port of the hybrid, and a second high pass filter similar to the first high pass filter connected between the output port of the hybrid and both the input of the second variable gain amplifier and the second rectifier means.

6. A loudspeaking telephone as defined in claim 1, 2 or 4, further including a first high pass filter having a center frequency at about 400 HZ connected between the output of the first variable gain amplifier and the input port of the hybrid, a second high pass filter similar to the first high pass filter connected between the output port of the hybrid and both the input of the second variable gain amplifier and the second rectifier means.

7. A loudspeaking telephone comprising:
(a) first means for amplifying and applying a first signal from a microphone to a bidirectional telephone line,
(b) second means for amplifying and applying a second signal from the telephone line to a speaker, said second signal including a reduced value of the signal from the microphone,
(c) first and second storing means for refreshing and storing decaying D.C. representations of said first and second signals, the refresh time characteristics of the storing means being significantly faster than their decay time characteristics,
(d) means for comparing said D.C. representations, and for providing a gain control signal relating thereto,
(e) means for adjusting the gain of the first and second amplifying and applying means in accordance with the gain control signal to provide transmission paths to the telephone line and the speaker in accordance with the relative levels of the D.C. representations stored in said first and second D.C. storing means respectively, and
(f) means for providing an offset to the gain of the first amplifying and applying means such that the gain of said first amplifying and applying means is greater than the gain of said second amplifying and applying means in the event said D.C. representations are substantially equal.

8. A loudspeaking telephone as defined in claim 7, further including high pass filter means for inhibiting the application of low frequency components of the first and second signals from being applied to the storing means.

9. A loudspeaking telephone as defined in claim 8 further including means for limiting the total amplitude of the D.C. representations applied to the comparing means.

10. A loudspeaking telephone as defined in claim 7, 8 or 9, in which the refresh time constant is about 5 milliseconds and the decay time constant is about 200 milliseconds.

11. A loudspeaking telephone as defined in claim 7, 8 or 9 in which each of the storing means is comprised of an R-C capacitor charging and discharging circuit hving an attack time of about 5 milliseconds and a decay time of about 200 milliseconds.

12. A loudspeaking telephone comprising a microphone, an outgoing signal variable gain amplifier having an input connected to the microphone, a loudspeaker, an incoming signal variable gain amplifier having its output connected to the loudspeaker, means for coupling the output of the outgoing amplifier and the input of the incoming amplifier to a telephone line, means for detecting the speech envelopes of the incoming and outgoing signals and storing reduced representations of the incoming and outgoing speech envelopes having much faster attack times than decay times, means for controlling the gains of said amplifiers in inverse relationship, the gains depending on the ratio between the amplitudes of said representations of the speech envelopes, and means for applying an offset to the incoming signal variable gain amplifier such that the gain of said outgoing signal variable gain amplifier is greater than the gain of said incoming signal variable gain amplifier.

13. A method of controlling a loudspeaking telephone comprising storing representations of an outgoing signal and an incoming signal in corresponding storage means with reduced representations of the incoming and outgoing signals respectively, in which the storage means have much faster attack times than decay times, comparing the representations, controlling the gains of outgoing and incoming signal paths according to the degree and polarity of the result of the comparison, and offsetting the gain of said outgoing signal path such that the gain of said outgoing signal path is greater than the gain of said incoming signal path.

* * * * *